(12) United States Patent
Justin

(10) Patent No.: US 12,494,646 B2
(45) Date of Patent: Dec. 9, 2025

(54) SYSTEM AND METHOD FOR MANAGING ELECTRIC ENERGY CONSUMPTION

(71) Applicant: Energy Control Services LLC, Phoenix, AZ (US)

(72) Inventor: Karl H. Justin, Phoenix, AZ (US)

(73) Assignee: Energy Control Services LLC, Phoenix, AZ (US)

( * ) Notice: Subject to any disclaimer, the term of this patent is extended or adjusted under 35 U.S.C. 154(b) by 334 days.

(21) Appl. No.: 17/875,384

(22) Filed: Jul. 27, 2022

(65) Prior Publication Data

US 2024/0039283 A1 Feb. 1, 2024

(51) Int. Cl.
*H02J 3/14* (2006.01)
*H02J 3/28* (2006.01)

(52) U.S. Cl.
CPC ............... *H02J 3/144* (2020.01); *H02J 3/28* (2013.01); *H02J 2300/20* (2020.01)

(58) Field of Classification Search
CPC .......... H02J 3/144; H02J 3/28; H02J 2300/20; H02J 3/008; H02J 3/32; H05B 45/10; H05B 47/14; H05B 47/17
USPC ........................................ 700/291, 295–296
See application file for complete search history.

(56) References Cited

U.S. PATENT DOCUMENTS

| | | | | |
|---|---|---|---|---|
| 2008/0046387 A1* | 2/2008 | Gopal | ..................... | H02J 3/008 705/412 |
| 2013/0274942 A1* | 10/2013 | Rees | ..................... | G06F 1/3206 700/295 |
| 2017/0279300 A1* | 9/2017 | Catalano | ............ | H05B 45/3725 |

* cited by examiner

*Primary Examiner* — Sean Shechtman
(74) *Attorney, Agent, or Firm* — Dana Legal Services; Jubin Dana

(57) ABSTRACT

A system and method for lowering electric power consumption and costs for lighting applications. The system uses environmentally friendly low power consuming Light Emitting Diodes (LED) emitters and switches between renewable electric power, non-renewable electric power and rechargeable battery power based upon the availability of renewable electric power and the cost of non-renewable electric power.

14 Claims, 6 Drawing Sheets

SYSTEM AND METHOD FOR MANAGING ELECTRIC ENERGY CONSUMPTION

FIELD OF THE INVENTION

The invention is in the field of computer systems and, more specifically, related to systems for managing electric energy consumption by managing light emitting diodes and rechargeable batteries.

BACKGROUND

Historically, electric energy (electricity) has been available for industrial, commercial, and home use from a continuously charged electric grid. The electricity in the grid has come from the consumption of non-renewable coal, natural gas, and oil; while nuclear production of electricity is by the nuclear fission of uranium and plutonium; and renewable hydroelectric power is generated by water flowing through and turning large turbines embedded in dams. All of the above sources produce a constant flow of electricity into the electric grid. During times of peak electricity usage, when many people return home from work or school, the supply of electricity available in a local grid may be insufficient to satisfy the demand. When this occurs, local power companies will need to purchase additional electricity from other producers at higher prices. These higher prices are passed along to the consumer in the form of higher electricity bills.

Another source of electrical energy is from renewable energy sources. Renewable electric energy fluctuates according to the fluctuations in nature. For example, solar power is dependent upon direct sunlight. During times of dense cloud cover and during the night solar electricity production slows down or ceases. Wind power depends upon the constancy and speed of wind. Ocean wave generated electric power is dependent upon the size and frequency of incoming and outgoing ocean waves. None of these renewable energy sources are as dependable as are traditional non-renewable (grid) electric energy sources such as coal generated electricity. For example, when there is a heavy cloud cover solar power plants produce much less electricity than when the sun is shining brightly. Then, the local grid operators may have to switch to buying grid electric power on the 10 minute, 5-minute or 1-minute markets. The cost for electric power on this short market can exceed $9.00/kWh. The consumer pays these higher costs.

Therefore, what is needed is a system and method that manages power consumption and lowers grid electricity usage during times of decreased production of renewable energy and during times of high cost, peak, grid electricity usage to provide, at least, the advantage of lowering the cost of electric power to industrial, commercial and/or residential consumers.

SUMMARY OF THE INVENTION

The invention discloses a system and method that lowers the cost of electricity for industrial, commercial, and/or residential consumers by utilizing a system that includes Light Emitting Diodes (LEDs), rechargeable batteries, LED Drivers and a Lighting Control System.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not limitations in the scope of the invention, the presently described aspects and embodiments and the presently understood best mode of the invention are described with additional detail through use of the accompanying drawings.

DETAILED DESCRIPTION

Figure 1:
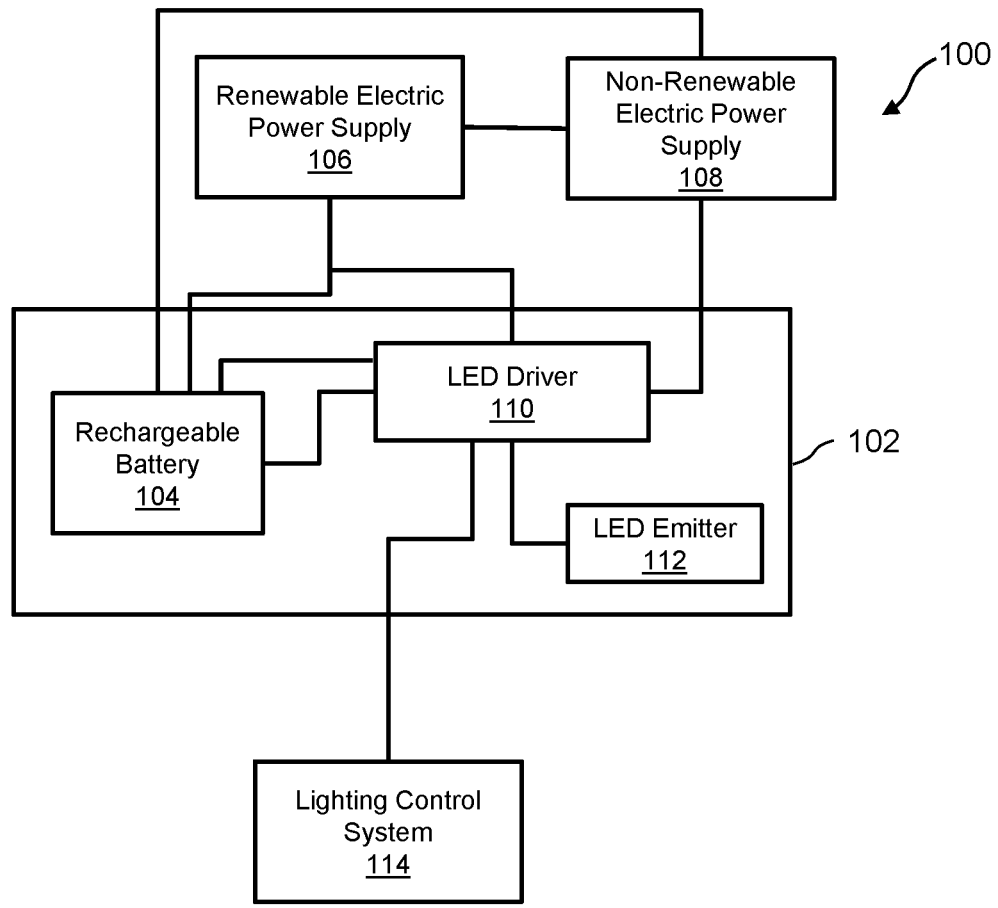
FIG. 1 shows a system for lowering electric energy usage and cost where renewable energy is available in accordance with various aspects and embodiments of the invention.

To the extent that the terms "including", "includes," "having", "has", "with", or variants thereof are used in either the detailed description and the claims, such terms are intended to be inclusive in a similar manner to the term "comprising". The invention is described in accordance with the aspects and embodiments in the following description with reference to the figures (FIGS.), in which like numbers represent the same or similar elements.

Reference throughout this specification to "one embodiment," "an embodiment," or "in accordance with some aspects" and similar language means that a particular feature, structure, or characteristic described in connection with the various aspects and embodiments are included in at least one embodiment of the invention. Thus, appearances of the phrases "in accordance with an aspect," "in accordance with one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

The ranges of values provided above do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In accordance with the various aspects and embodiments of the invention, a Lighting Control System switches the electricity source for Light Emitting Diodes (LEDs) between a renewable energy power source, such as solar power, the grid, and rechargeable batteries. At times when renewable electric energy is not sufficiently available due to environmental factors such as cloud cover with solar power, the Lighting Control System simultaneously turns off or reduces usage of the renewable energy source and switches electric power for the LEDs to the system's rechargeable battery. Conversely, when renewable energy is available, the Lighting Control System simultaneously turns off the rechargeable battery and switches electric power for the LEDs to the renewable energy source. When the rechargeable battery is not in use, it is recharged from the renewable energy source. If the renewable energy source is not available, the rechargeable battery is recharged from the non-renewable electric power grid. The grid is also used for directly powering the LEDs when renewable energy is limited or unavailable, and the rechargeable battery power is insufficient or too low.

For example and in accordance with one embodiment and aspects of the invention, in a hospital setting where solar power has been installed, the Lighting Control System controls the source of power for the hospital. On a bright, sunny day the hospital's electricity will be supplied by the hospital's own renewable (e.g. solar) power system while the rechargeable battery is being recharged for use during times of dense cloud cover and during the night. When solar power is unavailable and battery power is low, the Lighting Control System will switch the hospital's electricity source to the local external power grid. Then, the recharging of the battery will also be from the local external power grid.

In another embodiment of the invention, where renewable electric power is not installed or is not available, the system focuses on the demand driven cost of local electric power as the controlling factor in switching between the external electric grid and the system's rechargeable battery. In this scenario, when the local cost of electricity from the grid during peak electricity demand is above a predetermined threshold, the Lighting Control System simultaneously turns off grid power to the LEDs and turns on rechargeable battery power to the LEDs. Conversely, during times of off-peak grid electricity usage, when electricity cost is below the predetermined threshold cost, the Lighting Control System simultaneously turns off the rechargeable battery power and turns on the grid power to the LEDs. In accordance with the various aspects and embodiments of the invention, when the grid is supplying electricity to the LEDs, the grid is recharging the rechargeable battery.

In this example, the facility (e.g. hospital) does not have a renewable (e.g. solar) power source installed. Instead, it relies upon traditional local electric grid power, and pays the usual local grid price for electricity. In this embodiment of the invention, the Lighting Control System will detect when electricity cost is above a predetermined price threshold and will send a control signal to the LED Driver to turn off grid power and turn on rechargeable battery power. The Lighting Control System will also detect when electricity has fallen below the predetermined price threshold and send a control signal to the LED Driver to turn off battery power to the LEDs and turn on grid power. The rechargeable battery will then recharge when it is not being used to power the LED emitters.

The system has a powerful effect on lowering electricity usage and consumer cost by using renewable electric energy when available and switching to rechargeable battery power when renewable energy production is down. The system also has a powerful effect on lowering electricity usage and consumer cost in areas or facilities where renewable electric energy is not available by switching the system to grid power during lower electricity demand off-peak times and by using rechargeable battery power during high electricity demand peak times.

In another embodiment of the invention, the Lighting Control System is programmed to turn the grid power off and the rechargeable battery power on based upon historical daily electricity usage and cost data from a local utility company.

In one embodiment of the invention, the Lighting Control System records a time stamp when the battery power is turned on and another time stamp when the battery power is turned off.

In one embodiment of the invention, the Lighting Control System is able to calculate saving by capturing cost saving information when the LEDs are using renewable electric power and battery power rather than grid power.

In one embodiment of the invention, the Lighting Control System captures cost saving information including electric energy consumed by each LED by time and date intervals.

Referring now to FIG. 1, according to various aspects and embodiments of the invention, a system 100 is shown. The system 100 includes a luminaire housing 102. In accordance with the various aspects and embodiments of the invention, the housing 102 encapsulates a rechargeable battery 104, a DALI enabled LED Driver (LED Driver) 110, and an LED emitters 112. The rechargeable battery 104 is recharged by existing line voltage 120/277/480 voltage and is coupled to (in communication) with a renewable electric power supply 106, a non-renewable electric power supply 108 and a LED Driver 110. The LED Driver 110 is universal voltage and can handle 120/277/480 voltage. The LED Driver 110 is in communication with an external Lighting Control System 114, which controls (or manages) the LED Driver 110 by sending pre-programmed control signals to the LED Driver 110. The LED Driver 110 is also coupled to and in communication with an LED emitters 112. The LED Driver 110 is in communication with and receives electric power for the LEDs directly from the renewable electric power supply 106, the rechargeable battery 104 and/or from the non-renewable external power supply 108. The LED Driver 110, according to received control signals, channels electric power to the LED emitters 112 from the rechargeable battery 104, from the external renewable electric power supply 106, or from the non-renewable electric power supply 108. The LED Driver 110 converts incoming power supply voltage to low voltage to power the LED emitters 112. The LED emitters 112 then provides lighting illumination for a space.

In one embodiment of the invention, the Lighting Control System 114 is in communication with a source of renewable electric power supply 106, for example a solar power system 106 owned by a facility, such as a hospital. In accordance with one embodiment and aspects of the invention, when the sun is shining on the renewable electric power supply 106 and solar power is being produced, the Lighting control System 114 sends a control signal to the LED Driver 110 to stop power being supplied from the rechargeable battery 104 to the LED emitters 112. This allows the rechargeable battery 104 to be charged. Additionally, the power source for the system 100 is switched to the renewable electric power supply 106. When a heavy cloud cover occurs or at night, the renewable electric power supply 106 do not receive direct sunlight and do not produce electricity. The Lighting Control System 114 detects the decrease in electricity or power supply from the renewable electric power supply 106. The Light Control System 114 sends a control signal to the LED Driver 110 to turn off power to the LED emitters 112 from the renewable electric power supply 106 and to turn on power to the LED emitters 112 from the rechargeable battery 104. In this scenario, the system 100 ensures that the space being lighted by the LED emitters 112 is receiving electricity or power supply at the lowest possible price and is using environmentally friendly renewable energy rather than non-renewable energy as much as possible.

If, however, the rechargeable battery 104 is not recharged when renewable energy is not available, the Lighting Control System 114 sends a control signal to the LED Driver 110 to switch the system 100's power to the non-renewable electric power supply grid 108. This causes the LED emitters 112 is powered and the rechargeable battery 104 is charged from the non-renewable electric power supply 108.

In accordance with the various aspects and embodiments of the invention, referring again to renewable electric power 106 from a solar source. When the sunlight is strong all day, the system 100 may deliver more power than the facility needs. In this case, the Lighting Control System 114 directs electric power to the external non-renewable power supply grid 108, which purchases power from the owner of the system 100 that provides income to the owner of the system 100.

Figure 2:
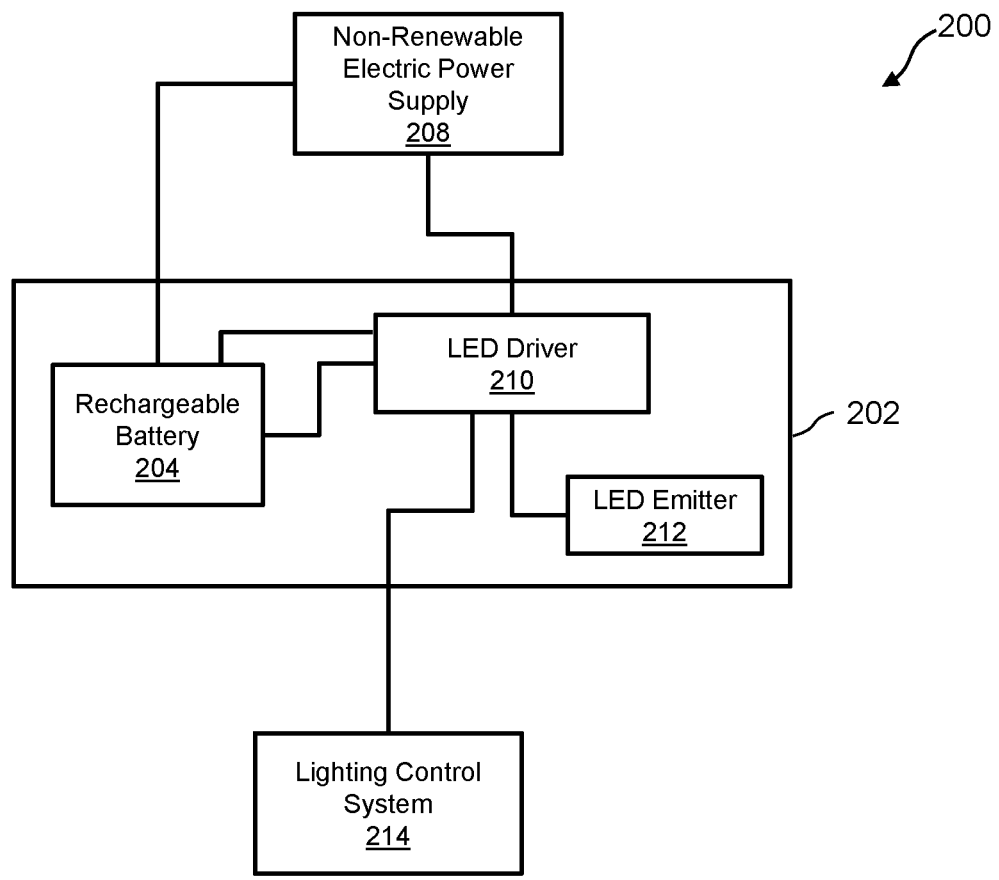
FIG. 2 shows a system for lowering electricity usage and cost where renewable electric power supply is not available in accordance with various aspects and embodiments of the invention.

Referring now to FIG. 2, according to various aspects and embodiments of the invention, the system 200 includes a luminaire housing 202 that includes a rechargeable battery 204, an LED emitter 212 and an LED Driver 210. The rechargeable battery 204 is electrically coupled to and in communication with a non-renewable electric power grid 208. The rechargeable battery 204 is capable of being recharged by the non-renewable electric power grid 208. The rechargeable battery 204 is also electrically coupled to and in communication with the LED Driver 210. The LED Driver 210 receives electric power directly from the non-renewable electric power grid 208 or the rechargeable battery 204. The LED Driver 210 is also electrically coupled to and in communication with the LED emitter 212, channeling electric power from the rechargeable battery 204 (or from the non-renewable electric power grid 208) to power the LED emitter 212. The LED Driver 210 converts external supply voltage to low voltage to power the LED emitter 212. The LED emitter 212 then provides lighting illumination for a space. The LED Driver 210 is also electrically coupled to and in communication with an external Lighting Control System 214. In accordance with the various aspects and embodiments of the invention, the Lighting Control System 214 sends a pre-programmed control signal to the LED Driver 210 to direct it to switch power to the LED emitter 212 from the non-renewable electric power grid 208 to the rechargeable battery 204 when the cost of non-renewable electricity from the non-renewable electric power grid 208 is above a predetermined threshold cost. The Lighting Control System 214 also sends pre-programmed control signal to the LED Driver 210 to direct it to switch power supply source to the LED emitter 212 from the rechargeable battery 204 to the non-renewable electric power grid 208 when the cost of the non-renewable electricity is below a predetermined threshold cost. During the interval when the LED emitter 210 is being powered by the non-renewable electric power grid 208, the rechargeable battery 204 is being recharged from the grid 208.

In one embodiment of the invention, the Lighting Control System 214 is in communication with a local electric power supply producer that manages the non-renewable electric power grid 208. Here, the Lighting Control System 214 receives real time data from the local electric power supply producer that shows when the cost of the external (or local) electricity is above or below a predetermined threshold cost for power source management that is programmed into the Lighting Control System 214.

In accordance with the various aspects and embodiments of the invention, the Lighting Control System 214 is pre-programmed with the times of peak (higher cost) and off-peak (lower cost) electricity in a local electric power market. These times of peak and off-peak electricity are used to set the predetermined threshold times for power source switching that is programmed into the Lighting Control System 214.

During times of off-peak electric power usage, the external Lighting Control System 214 sends a control signal to the LED Driver 210 that tells the LED Driver 210 to turn electric power to the LED emitter 212, which originates from the rechargeable battery 204, off. The LED Driver 210 will draw electric power for the LED emitter 212 only from the non-renewable electric power grid 208. In accordance with the various aspects and embodiments of the invention, during the interval when the LED emitters 212 are being powered by the non-renewable electric power grid 208, the rechargeable battery 204 is being recharged from the external power grid 208.

In accordance with the various aspects and embodiments of the invention, during times of peak electric power usage, the external Lighting Control System 214 sends a control signal to the LED Driver 210 that tells the LED Driver 210 to turn off the electric power to the LED emitters 212, originating from the non-renewable electric power grid 208, and to simultaneously turn on electric power to the LED emitters 212 originating from the rechargeable battery 204.

By drawing electric power from the non-renewable electric power grid 208 during off-peak hours, the LED emitters 212 are powered by lower cost electricity from the non-renewable electric power grid 208 while the rechargeable battery 204 is being recharged from the non-renewable electric power grid 208. By drawing electric power from the rechargeable battery 204 during higher cost peak hours, the LED emitter 212 is lighted by very low-cost electric power from the rechargeable battery 204.

Figure 3:
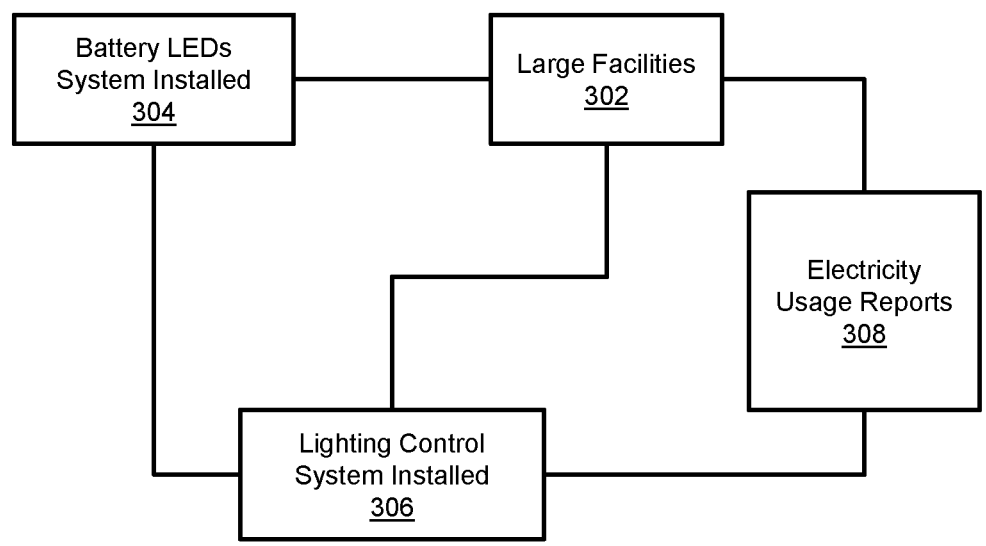
FIG. 3 shows a system for lowering energy usage and cost in accordance with various aspects and embodiments of the invention.

Referring now to FIG. 3, FIG. 2, and FIG. 1, according to various aspects and embodiments of the invention, a large facility 302 using a battery LED System 100, 200, or 304, being controlled and monitored by Lighting Control System 114, 214, or 306, respectively. The Lighting Control System 114, 214, 306 analyzes and records electricity usage by the system 100, 200 and generates electricity usage reports 308. The electricity usage reports 308 may include but are not limited to: reporting time stamp data from when the system 100, 200 switches between renewable electric power supply 106 to battery power 104, 204 and to non-renewable electric power grid 108, 208; reporting Kw/h costs per time interval and cost savings compared to strictly using electricity from the non-renewable electric power grid 108, 208. These reports are useful for a large facility 302 to assess the electric energy cost saving value of the system 100 or 200 for the overall operating cost of the large facility 302. When the Battery LED System 100, 200 is installed, the reports may also show the income back to the facility from selling surplus electricity to the local non-renewable electric power grid 108, 208.

Figure 4:
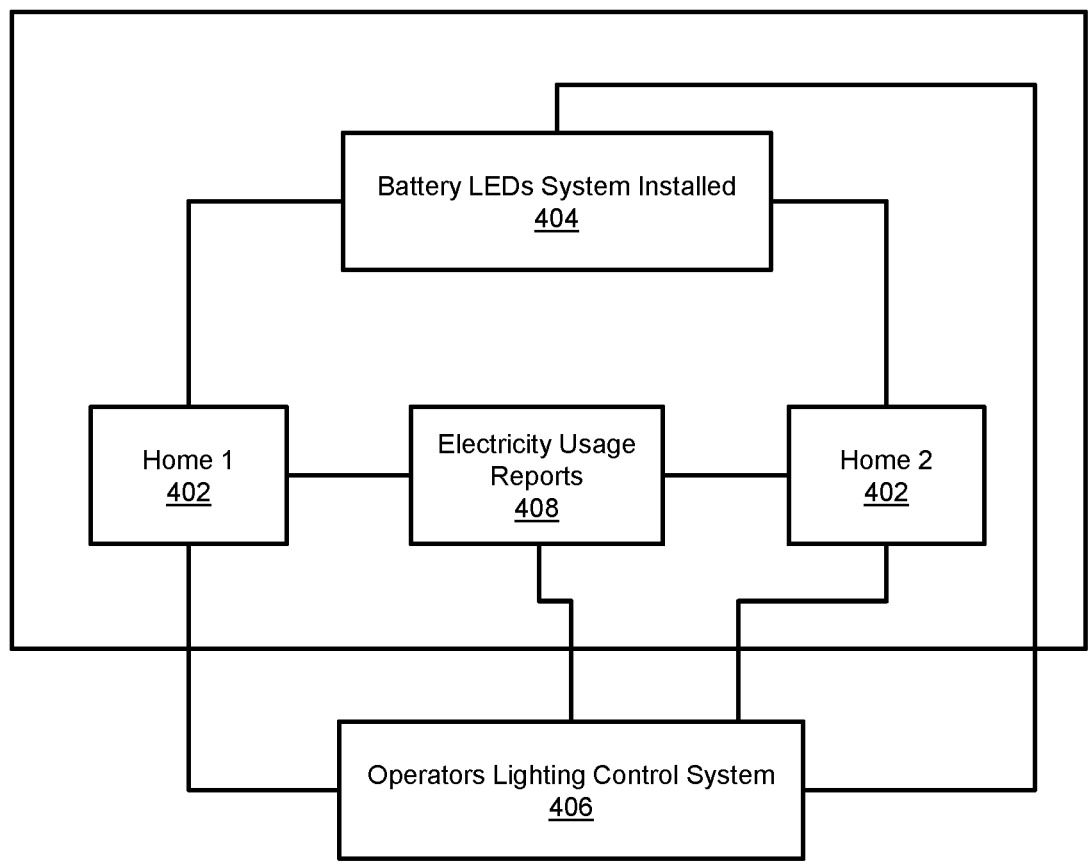
FIG. 4 shows a system for lowering electricity usage and costs for individual homeowners.
Figure 5:
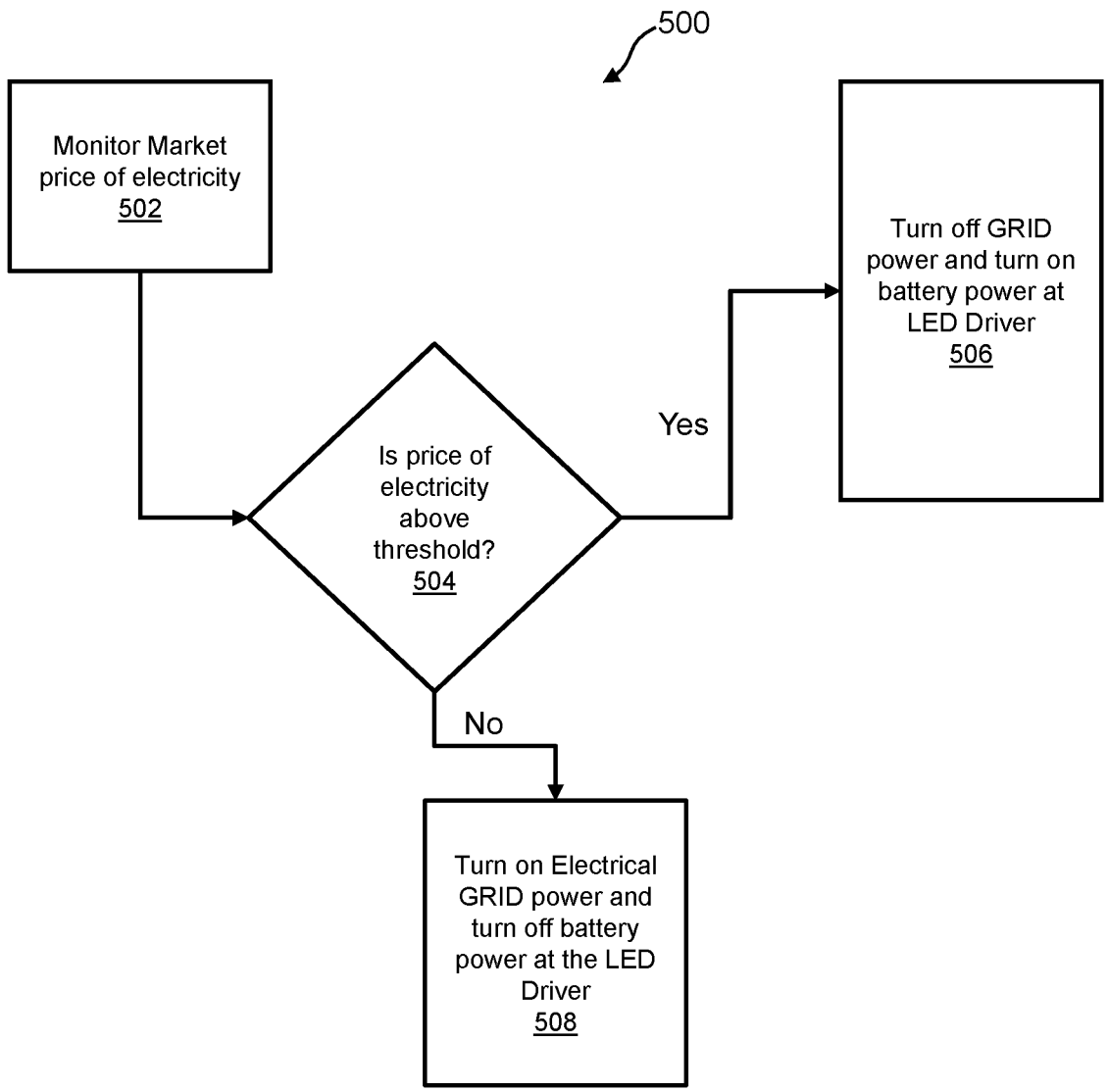
FIG. 5 shows a flow process for lowering electricity usage and cost in accordance with various aspects and embodiments of the invention.
Figure 6:
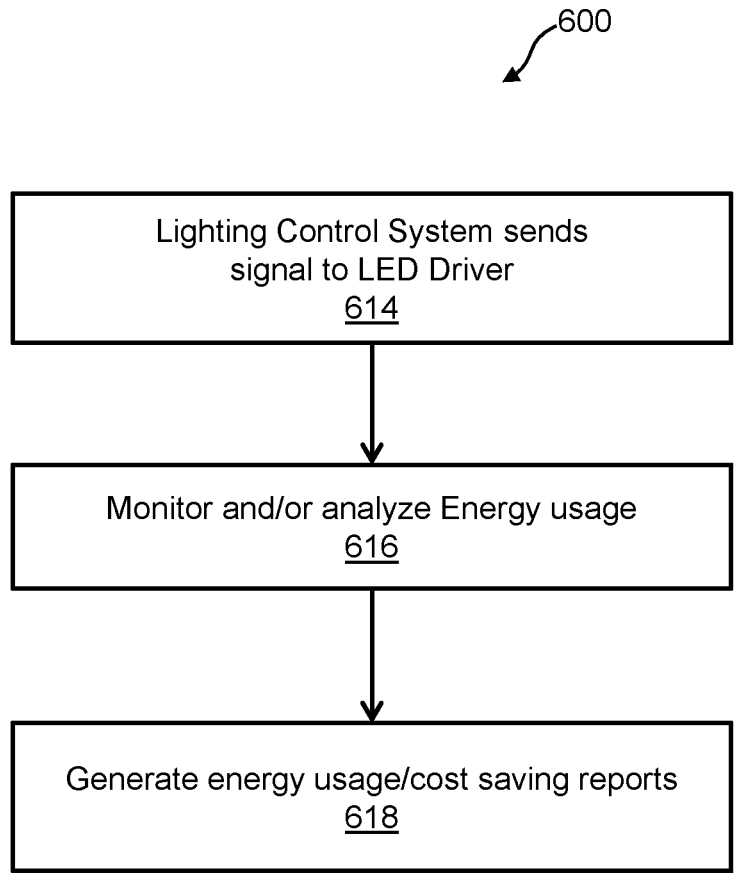
FIG. 6 shows a flow process for generating electricity usage and cost reports for customers.

Referring now to FIG. 4, FIG. 2, and FIG. 1, according to various aspects and embodiments of the invention, a residential neighborhood with the Battery LED System 100, 200, 404 installed is shown. The Lighting Control System 114, 214, 406 analyzes and records electricity usage the system 100, 200, 404 and generates electricity usage reports 408 individually tailored to the information needs of each individual homeowner 402 in the neighborhood. In accordance with the various aspects and embodiments of the invention, for a neighborhood-wide system 100, 200, 404, the Lighting Control System 114, 214, 406 may also generate electricity usage reports 408 tailored to the needs of a neighborhood homeowners association (HOA).

In accordance with the various aspects and embodiments of the invention, In accordance with the various aspects and embodiments of the invention, the electricity usage reports 408 may include but are not limited to reporting time stamps data from when the system 100 switches between renewable electric power supply 106, battery power 104, 204 and non-renewable electric power grid 108, 208; and reporting Kw/h costs per time interval and cost savings compared to only using the non-renewable electric power grid 108, 208.

These electricity usage reports 408 are useful for homeowners to understand and appreciate the energy cost saving value of the system 100, 200, 404 for the overall operating cost of their respective households. In accordance with the various aspects and embodiments of the invention, when the Battery LED System 100 that uses a renewable electric power supply 106 is installed, the electricity usage reports 408 also show the income back to each homeowner from selling surplus electricity to the non-renewable electric power grid 108.

When a whole neighborhood system 100, 200, 404 is in use, the generated electricity usage reports 408 may prove useful to the HOA for presenting the value of the system 100, 200, 404 to the individual homeowners in the neighborhood. The HOA may also use the electricity usage reports 408 to understand how much revenue the HOA may be receiving due to selling renewable energy back to a local electric power company.

Referring now to FIG. 5, FIG. 1, FIG. 2, FIG. 3 and FIG. 4, according to various aspects and embodiments of the invention, shows a flow process 500 for the functioning of the Lighting Control System 114, 214, 306, 406. At Step 502, in accordance with the various aspects and embodiments of the invention, the Lighting Control System 114, 214, 306, 406 monitors the market price of electricity by directly communicating with the local power grid 108 and 208. The Lighting Control System 114, 214, 306, 406 determines, at Step 504, when the local price of grid electricity 108, 208 increases above or below a predetermined level. At Step 506, when local grid price/kWh moves above the predetermined level or threshold, the Lighting Control System 114, 214, 306, 406 sends a control signal to the LED Driver 110, 210 to turn off power usage from the non-renewable electric power grid 108, 208, and to simultaneously turn on power from the rechargeable battery 104, 204 of system 100, 200, 304, 404, respectively. However, if, at Step 504, the Lighting Control System 114, 214, 306, 406 determines that the price of electric power is below the predetermined or threshold price, at Step 508, the Lighting Control System sends a control signal to the LED Driver 110, 210 to turn off the rechargeable battery 104, 204 and turn on the non-renewable electric power grid 108, 208.

At Step 502 in another embodiment of the invention, the Lighting Control System 114, 214, 306, 406 uses the non-renewable electric power grid 108, 208 information/records to monitor and assess times of peak, high cost, off-peak, and lower cost power or electricity supply. At Step 502, the Lighting Control System 114, 214, 306, 406 uses the local utility companies peak and off-peak usage and cost information to determine when to switch power from the non-renewable electric power grid 108, 208 to the rechargeable battery 104, 204, and then back to the grid 108, 208.

At Step 504, when local grid 108, 208 electricity usage is at peak demand/price, at Step 506, the Lighting Control System 114, 214, 306, 406 sends a control signal to the LED Driver 110, 210 to turn off grid 108, 208 power, and to simultaneously turn on power from the rechargeable battery 104, 204 of system 100, 200, 304, 404.

If, at Step 504, the Lighting Control System 114, 214, 306, 406 determines when electricity use is at off-peak demand/price, then at Step 508, the Lighting Control System 114, 214, 306, 406 sends a control signal to the LED Driver 110, 210 to turn on power supply from the non-renewable electric power grid 108, 208 and to turn off power supply from the rechargeable battery 104, 204.

Referring now to FIG. 6, FIG. 1, FIG. 2, FIG. 3, FIG. 4 and FIG. 5, according to various aspects and embodiments of the invention, a flow process 600 for the Lighting Control System 114, 214, 306, 406 is shown. At Step 614, the Lighting Control System sends a control signal to the LED Driver 110, 210 to switch electric power to the LED emitters 112, 212 from an external power supply 106, 108, 208 to a rechargeable battery 104, 204, and sends a control signal to the LED Driver 110, 210 to switch electric power to the LED emitters 112, 212 from a rechargeable battery 104, 204 to an external power supply 106, 108, 208.

At Step 616, the Lighting Control System monitors the amount and cost of kWh used per LED emitters 112, 212 for a selected time duration or segments of time. In accordance with the various aspects and embodiments of the invention, the system 100, 200, 302, 402 may want data on minute-by-minute use of electricity, while another user 302, 402 may want hourly or daily usage data. One user 302, 402 may want individual LED emitters 112, 212 electricity usage data, while another user 302, 402 may want aggregate data on a system of LED emitters made of many individual LED emitters 112, 212. At Step 618, the Lighting Control System generates customized energy usage (of battery or non-renewable electric power grid or renewable electric energy) and cost savings reports for users (customers).

Some of the systems discussed herein work by executing code on computer processors. A computer or computing device or computer processor includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host. Various embodiments store software for such processors as compiled machine code or interpreted code on non-transitory computer readable media.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Therefore, the scope of the invention is not intended to be limited to the various aspects and embodiments discussed and described herein. Rather, the scope and spirit of invention is embodied by the appended claims.

What is claimed is:

1. A system for managing power usage, the system comprising:
    a light fixture including at least one Light Emitting Diode (LED) within the light fixture;
    an LED Driver connected to the LED of the light fixture;
    a rechargeable battery connected to the LED Driver for powering the LED;
    an external power supply connected to the LED Driver for powering the LED; and
    a Lighting Control System in communication with the LED Driver,
    wherein the Lighting Control System determines when electricity cost is above or below a predetermined threshold cost,
    wherein the Lighting Control System switches power supply to the rechargeable battery, thereby eliminating use of the external power supply when electricity cost is above the predetermined threshold cost,
    wherein the Lighting Control System switches power supply to the external power supply when electricity cost is below the predetermined threshold cost,
    wherein the Lighting Control System identifies at least two different time stamps that are generated at instances when the system switches between power supplies, a first time stamp is generated at a first instant when power supply is switched from the external power supply to the rechargeable battery based on real time data and a second time stamp is generated at a second instant when power supply is switched from the rechargeable battery to the external power supply and wherein the first time stamp and the second time stamp are recorded in memory of the system, and
    wherein the Lighting Control System generates a report of cost savings for a time interval defined by the first time stamp and the second time stamp relative to costs for power without switching power supply.

2. The system of claim 1, wherein the Lighting Control System is in communication with a local electric utility and receives real time kilowatt-hour (kWh) cost data from the local electric utility.

3. The system of claim 1, wherein the Lighting Control System is pre-programmed with historic daily peak and off-peak electricity usage hours.

4. The system of claim 3, wherein during peak electricity usage hours the Lighting Control System switches power supply for the LED to the rechargeable battery.

5. The system of claim 3, wherein during off-peak electricity usage hours, the Lighting Control System switches power supply for the LED to the external power supply.

6. The system of claim 3, wherein external power supply includes a renewable power source and a non-renewable power source.

7. The system of claim 6, wherein during peak electricity usage hours the Lighting Control System switches power supply to the renewable power source if the renewable power source provides a threshold level of power.

8. The system of claim 1, wherein the Lighting Control System monitors and analyzes electric energy usage for the LED and generates electric power usage and cost savings data.

9. The system of claim 1, wherein the rechargeable battery is recharged directly from the external power supply.

10. The system of claim 1, wherein the external power supply includes a renewable power source and a non-renewable power source.

11. The system of claim 10, wherein during peak electricity usage hours the Lighting Control System switches power supply to originate from the renewable power source.

12. The system of claim 10, wherein during off-peak electricity usage hours the Lighting Control System switches power supply to the non-renewable power source.

13. The system of claim 10, wherein the Lighting Control System switches power supply for the LED from the renewable power source to the rechargeable battery when the renewable power source falls below a threshold power supply level and electricity cost from the non-renewable power source is above the predetermined threshold cost.

14. The system of claim 10, wherein the Lighting Control System switches power supply for the LED from the renewable power source to the non-renewable power source when the renewable power source falls below a threshold power supply level and electricity cost from the non-renewable power source is below the predetermined threshold cost.

* * * * *